(12) United States Patent
Takeno et al.

(10) Patent No.: US 8,557,934 B2
(45) Date of Patent: Oct. 15, 2013

(54) COPOLYMER LATEX AND METHOD FOR PRODUCING THE SAME

(75) Inventors: Kazutaka Takeno, Tokyo (JP); Toshiya Ohkubo, Tokyo (JP); Kunio Naoi, Tokyo (JP); Mitsugu Tsuruta, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 193 days.

(21) Appl. No.: 13/000,064

(22) PCT Filed: Jul. 2, 2009

(86) PCT No.: PCT/JP2009/062136
§ 371 (c)(1),
(2), (4) Date: Dec. 20, 2010

(87) PCT Pub. No.: WO2010/001964
PCT Pub. Date: Jan. 7, 2010

(65) Prior Publication Data
US 2011/0092630 A1    Apr. 21, 2011

(30) Foreign Application Priority Data

Jul. 4, 2008   (JP) .................. 2008-175723
Nov. 7, 2008   (JP) .................. 2008-286266

(51) Int. Cl.
*C08F 246/00*   (2006.01)
*C08L 101/14*   (2006.01)

(52) U.S. Cl.
USPC ................. 526/87; 526/318.6; 524/457

(58) Field of Classification Search
USPC .................. 524/457; 526/87, 318.6
See application file for complete search history.

(56) References Cited

U.S. PATENT DOCUMENTS

| | | | |
|---|---|---|---|
| 4,518,724 A | 5/1985 | Kuwajima et al. | |
| 5,444,118 A | 8/1995 | Tsuruoka et al. | |
| 5,637,644 A | 6/1997 | Tsuruoka et al. | |
| 5,786,100 A | 7/1998 | Tsuruoka et al. | |
| 2003/0113626 A1 | 6/2003 | Maeda et al. | |
| 2003/0225203 A1 | 12/2003 | Kurita et al. | |
| 2005/0043477 A1 | 2/2005 | Nishioka et al. | |

FOREIGN PATENT DOCUMENTS

| | | | |
|---|---|---|---|
| JP | 59-138276 A | 8/1984 | |
| JP | 2-28269 A | 1/1990 | |
| JP | 3-109451 A | 5/1991 | |
| JP | 4-39314 A | 2/1992 | |
| JP | 4-41511 A | 2/1992 | |
| JP | 6-293876 A | 10/1994 | |
| JP | 7-258308 A | 10/1995 | |
| JP | 10-1504 A | 1/1998 | |
| JP | 10-114882 A | 5/1998 | |
| JP | 2000-160059 A | 6/2000 | |
| JP | 2000-178497 A | 6/2000 | |
| JP | 2000178497 A | * 6/2000 | |
| JP | 2000-355670 A | 12/2000 | |
| JP | 2000355670 A | * 12/2000 | |
| JP | 2001-254298 A | 9/2001 | |
| JP | 2001254298 A | * 9/2001 | |
| JP | 2002-105386 A | 4/2002 | |
| JP | 2002-226524 A | 8/2002 | |
| JP | 2002-284958 A | 10/2002 | |
| JP | 2004-2718 A | 1/2004 | |
| JP | 2004-67967 A | 3/2004 | |
| JP | 2004-182898 A | 7/2004 | |
| JP | 2005-53950 A | 3/2005 | |
| WO | WO 2005/092969 A1 | 10/2005 | |
| WO | WO 2006/086688 A1 | 8/2006 | |

* cited by examiner

*Primary Examiner* — Kelechi Egwim
(74) *Attorney, Agent, or Firm* — Birch, Stewart, Kolasch & Birch, LLP

(57) ABSTRACT

Disclosed is a copolymer latex obtained by emulsion polymerization of a monomer mixture containing (a) 30-70% by mass of a conjugated diene monomer, (b) 0.1-15% by mass of an ethylenically unsaturated carboxylic acid monomer and (c) 15-69.9% by mass of one or more other copolymerizable monomers. The copolymer latex is characterized in that the toluene in-soluble content in the dried product obtained by drying the copolymer latex is 95-100% by mass; the mass ratio of the toluene-swollen toluene insoluble content to the dried toluene insoluble content (the toluene swelling degree) is 3.0-6.5; the number average particle diameter of the copolymer latex is 180-400 nm; and the glass transition starting temperature of the dried copolymer latex is within the range from −70° C. to −20° C. and the glass transition ending temperature thereof is within the range from 10° C. to 100° C. in differential scanning calorimetry.

14 Claims, 3 Drawing Sheets

COPOLYMER LATEX AND METHOD FOR PRODUCING THE SAME

TECHNICAL FIELD

The present invention relates to a copolymer latex preferably used for an aqueous coating and a method for producing a copolymer latex. More specifically, the present invention relates to a copolymer latex and a method for producing a copolymer latex that may realize a composition for an aqueous coating having advantageous effects of preventing blisters at the time of baking and drying a thick film and high chipping resistance at the time of baking and drying a thin film, and simultaneously having high adhesion to an electrodeposited plate serving as a substrate, and an effect when a coating is left as it is for a long time after the coating is applied, and the like.

BACKGROUND ART

The so-called chipping is known, which is a phenomenon that scratches are produced on a coating film applied onto a body outer plate and exterior parts of automobiles by collision of flying stones and gravels during traveling. For a purpose of protecting the coating film and a substrate from this chipping phenomenon, for example, in a floor rear portion of an automobile, a coating made of a vinyl chloride plastic sol composition has been conventionally applied to a steel sheet surface subjected to cathodic electrodeposition coating. However, the vinyl chloride plastic sol composition containing polyvinyl chloride may produce hydrogen chloride gas in an incineration treatment process of steel plates of waste automobiles, and may damage an incinerator.

Moreover, other than the floor rear portion, for example, in the side surface of the automobile body or the like, usually, an intermediate coating having chipping resistance is applied onto a steel sheet surface subjected to cathodic electrodeposition coating. As such an intermediate coating, a coating mainly containing a polyester resin or a polyurethane resin and using an organic solvent as a solvent is usually used. However, the coating using an organic solvent is preferable from the viewpoint of stability and operability of the coating, but is not preferable from the viewpoint of environmental impact (VOC and the like) and therefore, improvement is demanded.

Under such circumstances, in recent years, a composition for an aqueous coating has been proposed as a coating instead of the vinyl chloride plastic sol composition and the organic solvent coating.

However, the composition for an aqueous coating uses water as a dispersion medium. For this reason, there is a problem that it is easy to produce blisters of the coating attributed to vaporization of moisture particularly upon drying at a high temperature (approximately 90 to 160° C.). The blisters of the coating film are more easily produced as the film thickness of the coating is thicker. This problem is particularly serious in the case where a coating film having a thick film thickness needs to be formed in a specific part of the floor rear portion of the automobile.

From the viewpoint of energy saving by reducing the weight of vehicles, the market needs a coating film having a thinner film thickness. However, reduction in the film thickness leads to a problem of reduced chipping resistance.

Moreover, in a coating line for automobiles, usually, a coating composition is heated and dried with a heat drying furnace after about ten minutes to several hours after the coating composition is applied. However, in the case where an automobile coated under an environment at a high temperature and high humidity such as a rainy season and summer immediately before a holiday or before a factory enters long holiday intermission is left under an environment at a high temperature and high humidity for several days to around 10 days before heating and drying, coating film defects such as blisters and cracks may be produced when the coating of the automobile is heated and dried after the automobile is left as it is.

In order to solve such problems that the composition for an aqueous coating has, many related arts have been disclosed. For example, a copolymer latex (Patent Document 1) has been proposed in which various performances are improved by devising a method for adding a raw material monomer. Moreover, a copolymer latex containing a raw material monomer such as an epoxy group has been proposed (Patent Document 2).

Further, with respect to different layer structure type latices represented by a core shell latex, various latices have been proposed although description about an aqueous baking coating is not observed (Patent Document 3).

PRIOR ART DOCUMENT

Patent Document

[Patent Document 1] JP 2005-53950 A
[Patent Document 2] JP 2000-178497 A
[Patent Document 3] JP 03-109451 A

SUMMARY OF INVENTION

Problem to be Solved by the Invention

However, in reality, a sufficiently satisfactory composition for an aqueous coating is not obtained yet from the viewpoint of realizing a composition for an aqueous coating in which blisters at the time of baking and drying are prevented, and simultaneously the various problems as a coating, for example, chipping resistance, adhesion, and the effect when a coating is left as it is for a long time after the coating is applied are compatible in good balance. For example, the latices proposed for improvement of blisters still have room of improvement. Moreover, various proposals about different layer structure latices do not refer to improvement of blisters in a baking coating, chipping resistance, and the like at all.

Then, an object of the present invention is to provide a copolymer latex and a method for producing a copolymer latex that may realize a composition for an aqueous coating having a large effect of preventing blisters at the time of baking and drying a thick film and high chipping resistance at the time of baking and drying a thin film, and simultaneously having high adhesion to a substrate and a large effect when a coating is left as it is for a long time after the coating is applied, and the like.

Means for Solving the Problem

In order to solve the above-mentioned problems, the present inventors extensively studied a copolymer latex used as a material for a composition for an aqueous coating for chipping resistance, and completed the present invention.

Namely, the present invention provides a copolymer latex, a method for producing a copolymer latex, and a composition for a coating given below.
(1) A copolymer latex for a chipping-resistant coating obtained by emulsion polymerizing a monomer mixture containing: (a) 30% by mass to 70% by mass of a conjugated diene monomer, (b) 0.1% by mass to 15% by mass of an ethylene unsaturated carboxylic acid monomer, and (c) 15% by mass to 69.9% by mass of one or more other copolymerizable monomers, wherein toluene-insoluble matter in a dry substance obtained by drying the copolymer latex is 95% by mass to 100% by mass; a ratio of a mass of a toluene wet product of the toluene-insoluble matter to a mass of the dry substance of the toluene-insoluble matter (degree of swelling in toluene) are 3.0 to 6.5; the copolymer latex has a number average particle size of 180 nm to 400 nm; and the dry substance obtained by drying the copolymer latex has a glass transition starting temperature in a range of −70° C. to −20° C., and a glass transition ending temperature in a range of 10° C. to 100° C., as measured by differential scanning calorimetry.

(2) The copolymer latex described in (1) mentioned above, wherein the polymer latex has a number average particle size of 200 nm to 350 nm.

(3) The copolymer latex described in (1) mentioned above, wherein the polymer latex has a number average particle size of 220 nm to 330 nm.

(4) The copolymer latex described in any one of (1) to (3) mentioned above, wherein the toluene-insoluble matter in a dry substance obtained by drying the copolymer latex is in a range of more than 95% by mass to 100% by mass.

(5) The copolymer latex described in any one of (1) to (4) mentioned above, wherein as the (c) other copolymerizable monomer, 1% by mass to 15% by mass of a monomer having a hydroxyalkyl group is contained in the monomer mixture.

(6) The copolymer latex described in any one of (1) to (5) mentioned above, wherein as the (c) other copolymerizable monomer, 1% by mass to 30% by mass of a vinyl cyanide monomer is contained in the monomer mixture.

(7) A method for producing a copolymer latex for a chipping-resistant coating, wherein the copolymer latex has a number average particle size of 180 nm to 400 nm, toluene-insoluble matter in a dry substance obtained by drying the copolymer latex is 95% by mass to 100% by mass; a ratio of a mass of a toluene wet product of the toluene-insoluble matter to a mass of the dry substance of the toluene-insoluble matter (degree of swelling in toluene) are 3.0 to 6.5; and the dry substance obtained by drying the copolymer latex has a glass transition starting temperature in a range of −70° C. to −20° C., and a glass transition ending temperature in a range of 10° C. to 100° C., the method comprising: emulsion polymerizing through at least not less than two steps, a monomer mixture containing: (a) 30% by mass to 70% by mass of a conjugated diene monomer, (b) 0.1% by mass to 15% by mass of an ethylene unsaturated carboxylic acid monomer, and (c) 15% by mass to 69.9% by mass of one or more other copolymerizable monomers (wherein (a)+(b)+(c)=100% by mass), wherein a total of an amount of a chain transfer agent to be used in all the polymerization steps is not less than 0.050 parts by mass and less than 0.400 parts by mass based on 100 parts by mass of the total monomer mixture, the method comprising: a first step of preparing 40% by mass to 75% by mass of the total monomer mixture, and polymerizing the monomer mixture until the polymerization conversion reaches 50% by mass to 95% by mass, and then, second and subsequent steps of continuously or intermittently adding the remaining monomer mixture equivalent to 25% by mass to 60% by mass of the total monomer mixture to perform emulsion polymerization.

(8) The method described in (7), wherein f>e is satisfied where e designates part by mass of a chain transfer agent for the first step based on 100 parts by mass of the monomer mixture at the first step, and f designates part by mass of a chain transfer agent for the second and subsequent steps based on 100 parts by mass of the monomer mixture at the second and subsequent steps.

(9) The method described in (7) or (8), wherein x and y satisfy following expressions (I):

$$0.01 \leq x \leq 0.50,$$

$$0.02 \leq y \leq 1.50,$$

$$x < y, \text{ and}$$

$$x+y=f, \text{ where} \quad (I)$$

at the second and subsequent steps, the monomer mixture equivalent to 50 parts by mass of the monomer mixture based on 100 parts by mass of the monomer mixture at the second and subsequent steps and x part by mass of f parts by mass of the chain transfer agent at the second and subsequent steps are added continuously or intermittently, and then, the remaining monomer mixture equivalent to 50 parts by mass of the monomer mixture based on 100 parts by mass of the monomer mixture at the second and subsequent steps and y part by mass of the remaining chain transfer agent of f part by mass of the chain transfer agent at the second and subsequent steps are added continuously or intermittently to be polymerized.

(10) The method described in any one of (7) to (9) mentioned above, wherein the chain transfer agent is a chain transfer agent selected from mercaptans or a combination of a chain transfer agent selected from mercaptans and other chain transfer agent.

(11) The method described in any one of (7) to (10) mentioned above, wherein as the (c) other copolymerizable monomer, 1% by mass to 15% by mass of a monomer having a hydroxyalkyl group is contained in the monomer mixture.

(12) The method described in any one of (7) to (11) mentioned above, wherein as the (c) other copolymerizable monomer, 1% by mass to 30% by mass of a vinyl cyanide monomer is contained in the monomer mixture.

(13) The method described in any one of (7) to (12) mentioned above, wherein at the first step of preparing 40% by mass to 75% by mass of the total monomer mixture, and polymerizing the monomer mixture until the polymerization conversion reaches 50% by mass to 95% by mass, 40% by mass to 75% by mass of the total monomer mixture is prepared in batch to be polymerized.

(14) A composition for an aqueous coating, comprising a copolymer latex described in any one of (1) to (6) mentioned above.

(15) A composition for a chipping-resistant coating, comprising a copolymer latex described in any one of (1) to (6) mentioned above.

Advantageous Effect of the Invention

By using a copolymer latex according to the present invention for a material of a baking aqueous coating for automobiles, it is possible to prevent production of blisters at the time of baking and drying a thick film, which is a phenomenon peculiar to the aqueous coating. Simultaneously, it is possible to realize a composition for an aqueous coating having excellent physical properties such as high chipping resistance at the time of baking and drying a thin film, and high adhesion to a substrate, and a large effect when a coating is left as it is for a long time after the coating is applied. Moreover, by using a copolymer latex produced by the method according to the present invention, an aqueous coating may be used at a high temperature baking step, and VOC problems caused by an organic solvent and the problem of production of hydrogen chloride at the incineration treatment step of steel plates of waste automobiles may be avoided. Additionally, a thinner coating film may be applied to the floor rear portion or in the intermediate coating film.

DETAILED DESCRIPTION OF THE INVENTION

Figure 1:
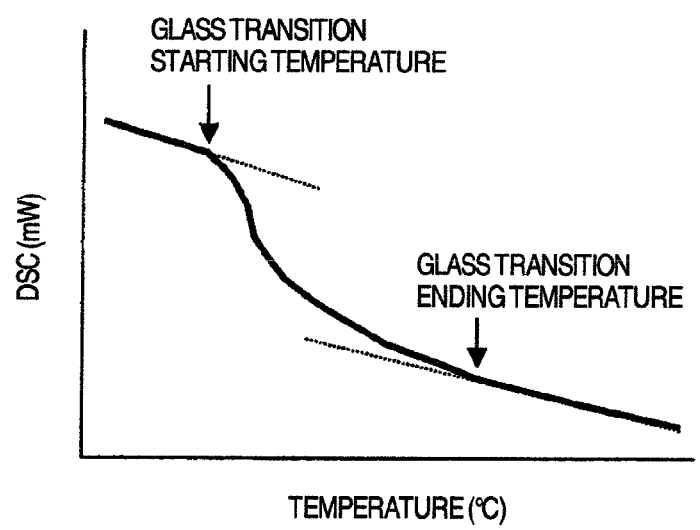
FIG. 1 shows an example of a differential scanning calorimetry curve of a copolymer latex.

Hereinafter, modes for implementing the present invention (hereinafter, embodiments of the invention) will be described in detail. The present invention will not be limited to the following embodiments, and may be modified in various ways within the scope of the gist to be implemented.

The present invention may be formed by emulsion polymerizing a conjugated diene monomer and a monomer copolymerizable with the conjugated diene monomer. The conjugated diene monomer component is an important component in order to give flexibility to a copolymer and to give impact absorbing properties.

Preferable examples of the conjugated diene monomer include 1,3-butadiene, isoprene, and 2-chloro-1,3-butadiene. One of these may be used alone, or not less than two thereof may be used in combination.

The proportion of the conjugated diene monomer component based on a monomer mixture is usually 30% by mass to 70% by mass, and preferably 35% by mass to 65% by mass. By setting the amount of the conjugated diene monomer component to be used in the above-mentioned range, proper flexibility and elasticity may be given to a copolymer latex and chipping resistance of a coating film may be improved.

In the present invention, an ethylene unsaturated carboxylic acid monomer is a component preferably used in order to give dispersion stability necessary for the copolymer latex and to enhance binding action with a pigment.

Examples of the ethylene unsaturated carboxylic acid monomer include acrylic acid, monobasic ethylene unsaturated carboxylic acid monomers such as methacrylic acid, dibasic ethylene unsaturated carboxylic acid monomers such as itaconic acid, maleic acid, and fumaric acid. One of these may be used alone, or not less than two thereof may be used in combination.

Moreover, a proportion of the ethylene unsaturated carboxylic acid monomer based on the monomer mixture is usually 0.1% by mass to 15% by mass, and preferably 0.3% by mass to 7% by mass. By setting the amount of the ethylene unsaturated carboxylic acid monomer to be used in the above-mentioned range, good dispersion stability of the obtained copolymer latex may be kept. Additionally, a viscosity of the copolymer latex or that of an aqueous coating using this copolymer latex may be adjusted in a proper range such that there is no trouble in handling.

In the present invention, the kind of the other copolymerizable monomer may be selected properly to give various properties to the copolymer latex. Preferable examples of the other copolymerizable monomer include monomers having a hydroxyalkyl group, vinyl cyanide monomers, aromatic vinyl monomers, alkyl(meth)acrylate ester monomers. One of these may be used alone, or not less than two thereof may be used in combination.

Moreover, a proportion of the other copolymerizable monomer based on the monomer mixture is usually 15% by mass to 69.9% by mass.

The monomers used as the other copolymerizable monomer and having a hydroxyalkyl group are preferably used for high adhesion to a substrate in a coating containing the copolymer latex.

Examples of the monomers having the hydroxyalkyl group include ethylenically unsaturated carboxylic acid hydroxy alkyl ester monomers, allyl alcohol, and N-methylolacrylamide. One of these may be used alone, or not less than two thereof may be used in combination. More specifically, examples of the ethylenically unsaturated carboxylic acid hydroxy alkyl ester monomers include 2-hydroxyethyl(meth)acrylate.

Moreover, a proportion of the monomer having a hydroxyalkyl group to the monomer mixture is preferably 1% by mass to 15% by mass, more preferably 2% by mass to 13% by mass, and still more preferably 3% by mass to 10% by mass. Good adhesion may appear at a proportion of not less than 1% by mass. Moreover, at a proportion of not more than 15% by mass, the viscosity of the copolymer latex or that of the coating using the copolymer latex may be adjusted at a viscosity at which handling is easy.

The vinyl cyanide monomer is a component preferably used in order to give high adhesion to the substrate and simultaneously to enhance the cohesive attraction of the copolymer latex.

Examples of the vinyl cyanide monomer include acrylonitrile, methacrylonitrile, and α-chloracrylonitrile. One of these may be used alone, or not less than two thereof may be used in combination.

Moreover, a proportion of the vinyl cyanide monomer based on the monomer mixture is preferably 1% by mass to 30% by mass, and more preferably 2% by mass to 27% by mass. By setting the amount of the vinyl cyanide monomer to be used in the range, chipping resistance and blister resistance of the coating film may be improved simultaneously without reducing polymerization stability, and an effect of enhancing adhesion to the substrate may be further obtained.

Examples of the aromatic vinyl monomer include styrene, α-methylstyrene, vinyltoluene, and p-methylstyrene. One of these may be used alone, or not less than two thereof may be used in combination.

Examples of the alkyl(meth)acrylate ester monomer include methyl (meth)acrylate, ethyl(meth)acrylate, butyl (meth)acrylate, 2-ethylhexyl(meth)acrylate, cyclohexyl (meth)acrylate, and dodecyl(meth)acrylate. One of these may be used alone, or not less than two thereof may be used in combination.

Other than the various monomers mentioned above, other various copolymerizable monomers may be blended with the monomer mixture. Examples of such a monomer include aminoalkyl esters such as aminoethyl acrylate, dimethylaminoethyl acrylate, and diethylaminoethyl acrylate; pyridines such as 2-vinylpyridine and 4-vinylpyridine; glycidyl esters such as glycidyl acrylate and glycidyl methacrylate; amides such as acrylamide, methacrylamide, N-methylolacrylamide, N-methylacrylamide, N-methylmethacrylamide, glycidyl methacrylamide, and N,N-butoxymethylacrylamide; carboxylic acid vinyl esters such as vinyl acetate; vinyl halides such as vinyl chloride; and polyfunctional vinyl monomers such as divinylbenzene, (poly)ethyleneglycol di(meth)acrylate, hexanediol di(meth)acrylate, 1,4-butanediol di(meth)

acrylate, and allyl(meth)acrylate. One of these may be used alone, or not less than two thereof may be used in combination.

From the viewpoint of stability of the copolymer latex obtained, chipping resistance, adhesion, and blister resistance of the coating, styrene, acrylic acid 2-hydroxyethyl(2-hydroxyethyl acrylate), and acrylonitrile are preferably blended as the other copolymerizable monomer.

The content (gel fraction) of the toluene-insoluble matter of a dry substance obtained by drying the copolymer latex obtained by the method for producing a copolymer latex according to the present embodiment is usually 95% by mass to 100% by mass, preferably more than 95% by mass and to 100% by mass, and more preferably 96% by mass to 99% by mass. By adjusting the toluene-insoluble matter in this range, blister resistance of the coating film using the copolymer latex obtained by the method for producing a copolymer latex according to the present embodiment and chipping resistance of the coating may be improved. Although the toluene-insoluble matter may be controlled with a known method, it is important to perform adjustment with the amount of a chain transfer agent.

For developing high blister resistance and adhesion of the coating film, it is very important to control the degree of swelling of the dry substance with respect to toluene in the copolymer latex obtained by the method for producing a copolymer latex according to the present embodiment (degree of swelling in toluene) in a specific range. The degree of swelling in toluene serves as a scale for the crosslinking density of the copolymer latex. When the degree of swelling in toluene is low, namely, when the crosslinking density is high, blister resistance is improved. Moreover, when the degree of swelling in toluene is high, namely, when the crosslinking density is low, adhesion to the substrate and the effect when a coating is left as it is for a long time after the coating is applied are improved. A preferable range of the degree of swelling in toluene is usually 3.0 to 6.5, preferably 3.2 to 6.2, and more preferably 3.5 to 6.0. At a degree of swelling in toluene of this range, the copolymer latex having high blister resistance, high adhesion to the substrate, and a large effect when a coating is left as it is for a long time after the coating is applied may be obtained. The degree of swelling with respect to toluene (degree of swelling in toluene) means the mass ratio of the mass of the dry substance to be measured when it is swollen with toluene to be saturated to the mass of the dry substance.

The degree of swelling in toluene may be reduced by selecting a condition to accelerate a crosslinking reaction of the diene monomer in a copolymerization process. Examples of the condition to accelerate the crosslinking reaction include raising of a polymerization temperature, and reduction in a monomer concentration in the polymerization system. Control of the monomer concentration in the polymerization system is very effective as a method for controlling the degree of swelling in toluene. The monomer concentration in the polymerization system changes according to a method for adding a monomer into the polymerization system. Accordingly, the monomer concentration may be controlled by appropriately selecting the method for adding a monomer into a polymerization system. For example, comparing with batch polymerization in which a monomer is prepared in batch, in a method for continuously adding a monomer, the monomer concentration in the polymerization system is lower. Moreover, the monomer concentration in the polymerization system is lower as the time to add the monomer is longer. Moreover, in the case of multistep polymerization, when polymerization conversion at a previous step becomes sufficient high and the monomer is added at a subsequent step, the monomer concentration in the polymerization system is reduced.

In the method for producing a copolymer latex according to the present embodiment, preferably, a multistep polymerization method is used to prepare 40% by mass to 75% by mass of the total monomer mixture at a first step, and to add the monomer mixture at the second and subsequent steps after polymerization conversion of the monomer mixture at the first step reaches the range of 50% by mass to 95% by mass. At the first step and the second and subsequent steps, there are methods for adding a monomer mixture in batch, continuously, or intermittently, and either of the methods may be used. On the other hand, the monomer mixture is preferably prepared in batch at the first step. At the first step, 40% by mass to 75% by mass of the total monomer mixture is prepared. After polymerization conversion of the monomer mixture at the first step reaches the range of 50% by mass to 95% by mass, as the second and subsequent steps, the remaining monomer mixture equivalent to 25% by mass to 60% by mass of the monomer mixture is added. Thereby, the degree of swelling in toluene may be controlled in the range.

The copolymer latex obtained by the method for producing a copolymer latex according to the present embodiment, preferably, has a glass transition starting temperature in the range of −70° C. to −20° C., and a glass transition ending temperature in the range of 10° C. to 100° C., as measured by differential scanning calorimetry.

Usually, in the case where the amount of heat produced from a sample is measured using a differential scanning calorimeter and a measured temperature is continuously changed, the glass transition region in a differential scanning calorimetry curve is observed as a stepwise change, namely, a change such that the curve shifts from a base line so far to a new base line. The glass transition starting temperature is defined as a temperature at which a stepwise change of glass transition starts with respect to the base line on a low temperature side and the curve begins to depart from the base line. The glass transition ending temperature is defined as a temperature when the stepwise change finishes with respect to the base line on a high temperature side and the curve returns to the base line (see FIG. 1).

A preferable range of the glass transition starting temperature of the copolymer latex obtained by the method for producing a copolymer latex according to the present embodiment is −70° C. to −20° C. A more preferable range thereof is −65° C. to −25° C. Moreover, a preferable range of the glass transition ending temperature is 10° C. to 100° C., and more preferably 15° C. to 90° C.

The copolymer latex obtained by the method for producing a copolymer latex according to the present embodiment has the glass transition starting temperature and the glass transition ending temperature in the above-mentioned ranges. In the coating using this copolymer latex, high chipping resistance and blister resistance may be compatible.

The copolymer latex obtained by the method for producing a copolymer latex according to the present embodiment has a specific glass transition starting temperature and a specific glass transition ending temperature, while the so-called number of glass transition temperatures (Tg) is not limited. The glass transition temperature may be detected as a peak in a differential curve (temperature−electricity/time curve) of the differential scanning calorimetry curve, and the differential curve may have one peak or not less than two peaks, or may show no clear peak but a curve of a trapezoidal shape.

The copolymer latex according to the present embodiment having a specific glass transition starting temperature and a specific glass transition ending temperature may be produced by performing not less than two steps of polymerization. Particularly, the glass transition starting temperature and the glass transition ending temperature may be controlled at a desired temperature by adjusting and producing a composition of the mixture such as a monomer and the like at each step. For example, production may be performed using a two-step polymerization method having a step of polymerizing a monomer mixture in which the content of a conjugated diene monomer is not less than 40% by mass, and a step of polymerizing a monomer mixture in which the content of a conjugated diene monomer is not more than 40% by mass. Production may also be performed using a polymerizing method for having a three or more steps of the polymerization process instead of the two steps.

The number average particle size of the copolymer latex obtained by the method for producing a copolymer latex according to the present embodiment is usually 180 nm to 400 nm, preferably 190 nm to 370 nm, more preferably 200 nm to 350 nm, still more preferably 210 nm to 340 nm, and most preferably 220 nm to 330 nm. At a number average particle size of this range, the coating using the copolymer latex obtained by the method for producing a copolymer latex according to the present embodiment has high blister resistance and chipping resistance.

The number average particle size may be adjusted by using a method for adjusting the amount of an emulsifier used upon production with emulsion polymerization, or a known seed polymerization method. As the seed polymerization method, methods such as an internal seeding method for producing seeds and subsequently polymerizing a copolymer latex in the same reaction system and an external seeding method using seeds produced separately may be properly selected and used.

For the method for producing a copolymer latex according to the present embodiment, a method for performing polymerization with a radical initiator in an aqueous medium in the presence of an emulsifier may be used, for example.

As the emulsifier to be used, conventionally known anionic, cationic, amphoteric, and nonionic emulsifiers may be used. Examples of a preferable emulsifier include anionic emulsifiers such as aliphatic soaps, rosin acid soaps, alkyl sulfonate salts, alkyl diphenyl ether disulfonate salts, alkyl sulfosuccinate salts, and polyoxyethylene alkyl sulfate salts; and nonionic emulsifiers such as polyoxyethylene alkyl ether, polyoxyethylene alkyl aryl ether, and polyoxyethylene oxypropylene block copolymers. One of these may be used alone, or not less than two thereof may be used in combination. The amount of the emulsifier to be used is preferably 0.1 parts by mass to 2.0 parts by mass based on 100 parts by mass of the total monomer mixture.

A reactive emulsifier having radical polymerizable double bonds of a vinyl group, an acryloyl group, or a methacryloyl group in molecules is also used without a problem.

A radical initiator starts addition polymerization of a monomer by radical decomposition in the presence of heat or a reducer. Both inorganic initiators and organic initiators may be used for the radical initiator. Examples of a preferable initiator include peroxydisulfate salts, peroxides, and azobis compounds.

More specifically, examples of such an initiator include potassium peroxodisulfate, sodium peroxodisulfate, ammonium peroxodisulfate, hydrogen peroxide, t-butylhydroperoxide, benzoyl peroxide, 2,2-azobis butyronitrile, and cumene hydroperoxide. One of these may be used alone, or not less than two thereof may be used in combination.

The so-called redox polymerization method may also be used, in which a reducer such as sodium hydrogen sulfite, ascorbic acid and salts thereof, erythorbic acid and salts thereof, and Rongalit is used in combination with the above-mentioned polymerization initiator.

A chain transfer agent is used in the method for producing a copolymer latex according to the present embodiment. Preferable examples thereof include α-methylstyrene dimers, which are one of the dimers of nucleus-substituted α-methylstyrene; mercaptans such as n-butyl mercaptan, t-butyl mercaptan, t-dodecyl mercaptan, n-octyl mercaptan, and n-lauryl mercaptan; disulfides such as tetramethylthiuram disulfide and tetraethylthiuram disulfide; halogenated derivatives such as carbon tetrachloride and carbon tetrabromide, and 2-ethylhexyl thioglycolate. One of these may be used alone, or not less than two thereof may be used in combination. Of these, mercaptans may be used suitably.

The amount of the chain transfer agent to be used is usually not less than 0.050 parts by mass and less than 0.400 parts by mass based on 100 parts by mass of the total monomer mixture as a proportion, and more preferably 0.070 parts by mass to 0.370 parts by mass. By setting the amount of the chain transfer agent to be used in the above-mentioned range, respectively, the coating using the copolymer latex obtained by the method for producing a copolymer latex according to the present embodiment has high adhesion, blister resistance, and chipping resistance.

In the method for producing a copolymer latex according to the present embodiment, e part by mass of the chain transfer agent for the first step based on 100 parts by mass of the monomer mixture used at the first step is added at the first step, f part by mass of the chain transfer agent for the second and subsequent steps based on 100 parts by mass of the monomer mixture used at the second and subsequent steps is added at the second and subsequent steps, and the amounts thereof to be added satisfy f>e. Moreover, at the second and subsequent steps, above x and y are preferably within the range represented by x<y and x+y=f when the monomer mixture equivalent to 50 parts by mass based on 100 parts by mass of the monomer mixture used at the second and subsequent steps and x part by mass off part by mass of the chain transfer agent at the second and subsequent steps are added continuously or intermittently, and next, the remaining monomer mixture equivalent to 50 parts by mass based on 100 parts by mass of the monomer mixture used at the second and subsequent steps and y part by mass of the remaining chain transfer agent in f part by mass of the chain transfer agent at the second and subsequent steps are added continuously or intermittently to be polymerized. Preferably, x part by mass of the chain transfer agent is in the range of $0.01 \leq x \leq 0.50$, more preferably $0.02 \leq x \leq 0.45$, and still more preferably $0.03 \leq x \leq 0.40$. Preferably, y part by mass of the chain transfer agent is in the range of $0.02 \leq x \leq 1.50$, more preferably $0.03 \leq x \leq 1.30$, and still more preferably $0.04 \leq x \leq 1.00$. By setting each amount of the chain transfer agent used in the above-mentioned range, the coating using the copolymer latex obtained by the method for producing a copolymer latex according to the present embodiment has high adhesion.

Of f part by mass of the chain transfer agent at the second and subsequent steps, x part by mass of the chain transfer agent used at the second and subsequent steps means the amount of the chain transfer agents used before adding the monomer mixture equivalent to 50 parts by mass based on 100 parts by mass of the monomer mixture used at the second and subsequent steps. Moreover, off part by mass of the chain transfer agent at the second and subsequent steps, y part by mass of the chain transfer agent used at the second and subsequent steps means the amount of the chain transfer agent used during adding the remaining monomer mixture equivalent to 50 parts by mass after adding the monomer mixture equivalent to 50 parts by mass based on 100 parts by mass of the monomer mixture used at the second and subsequent steps.

In the method for producing a copolymer latex according to the present embodiment, known addition methods such as one-time addition, batch addition, continuous addition, or a combination thereof are used as a method for adding a chain transfer agent. There is a variety of the addition methods, for example, a method for adding a chain transfer agent in batch at each step, a method for continuously adding a monomer mixture and a chain transfer agent at each step, and a method for adding a chain transfer agent in combination with batch addition and continuous addition at each step. As long as the above-mentioned f>e is satisfied, any method may be used as the addition method.

Figure 2:
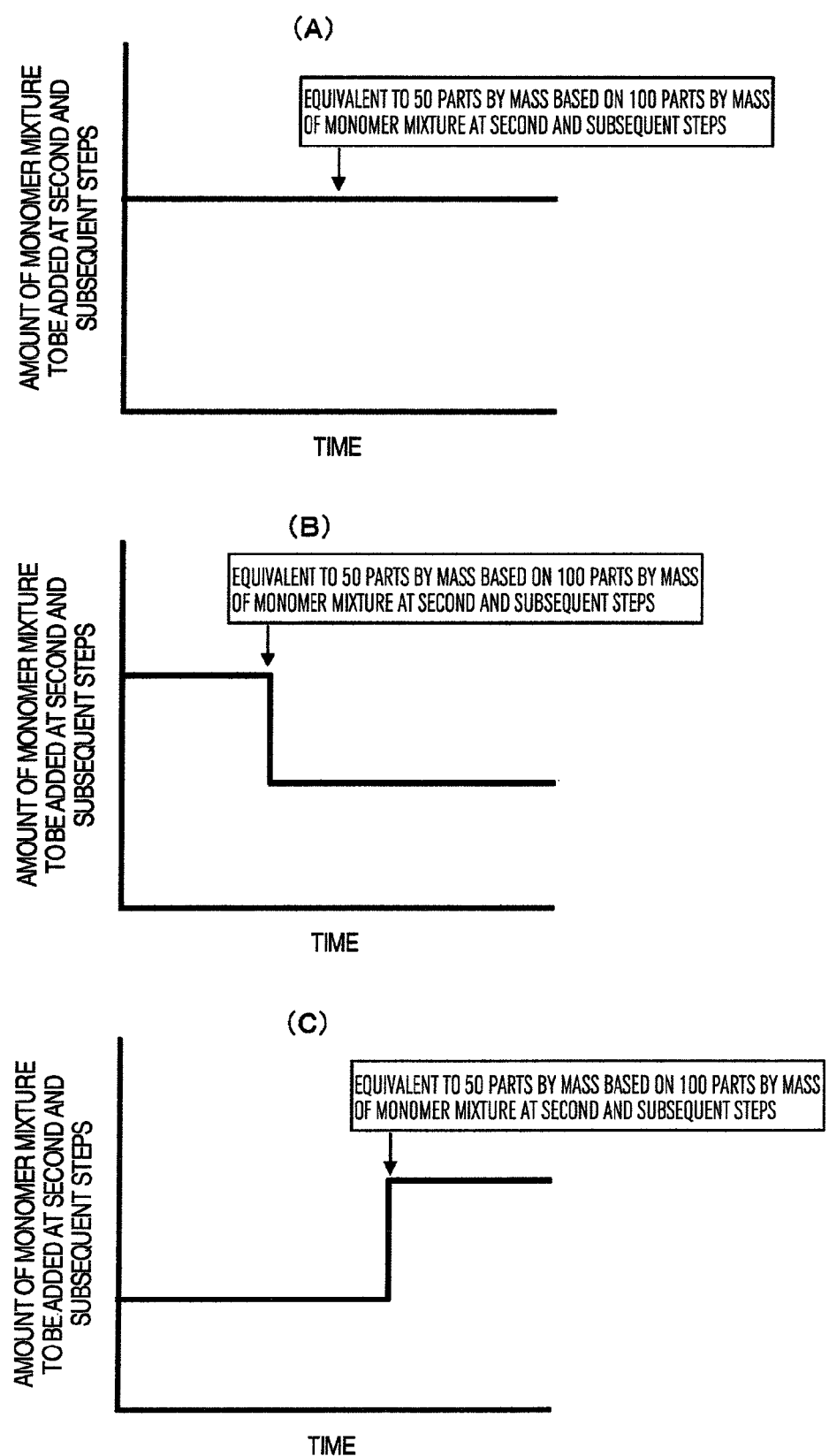
FIG. 2 shows an example showing addition of a monomer mixture at second and subsequent steps.
Figure 3:
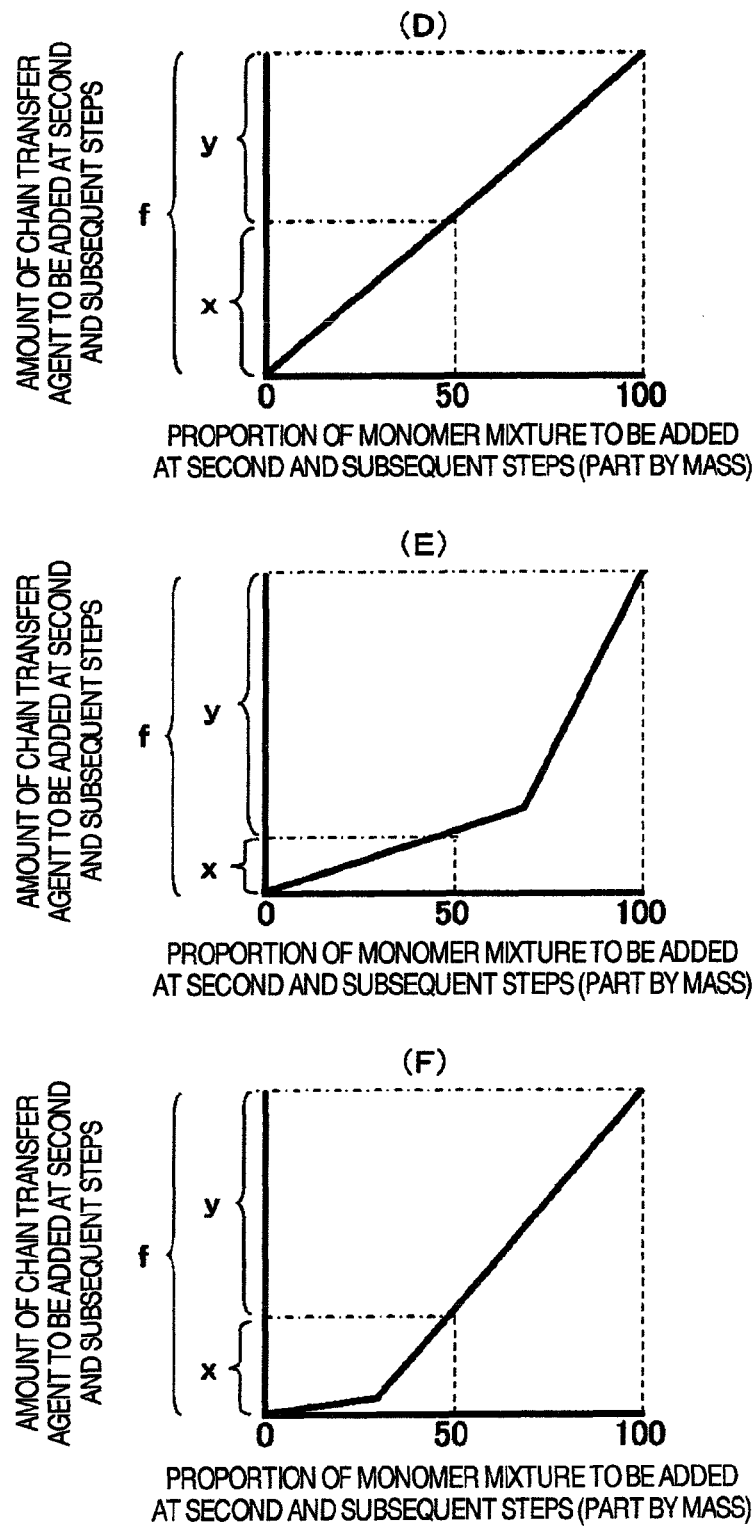
FIG. 3 shows an example showing addition of a chain transfer agent at second and subsequent steps.

In the method for producing a copolymer latex according to the present embodiment, a preferable method for adding a chain transfer agent used at the second and subsequent steps is the method that satisfies the above-mentioned x<y. For example, the amount of the monomer mixture to be added at the second and subsequent steps may be changed as shown in FIGS. 2(A) to 2(C), and the amount of the chain transfer agent to be added at the second and subsequent steps may be changed as shown in FIGS. 3(D) to 3(F). In the case of FIG. 3(D), x part by mass of the chain transfer agent at the second and subsequent steps is the same as y part by mass of the chain transfer agent at the second and subsequent steps (x=y). In the cases of FIGS. 3(E) to 3(F), it is shown that the amount of the chain transfer agent to be added is increased by post addition of the chain transfer agent or the like at and after a point at which the graph is bent. In each of FIGS. 3(E) and 3(F), x part by mass of the chain transfer agent at the second and subsequent steps is smaller than y part by mass of the chain transfer agent at the second and subsequent steps. Usually, addition of the chain transfer agent used at the second and subsequent steps may also be any of FIGS. 3(D) to 3(F), for example, as long as the above-mentioned f>e is satisfied. Preferable addition of the chain transfer agent, however, is the method that satisfies the above-mentioned x<y, for example, as in FIGS. 3(E) and 3(F).

The polymerization temperature in the method for producing a copolymer latex according to the present embodiment is 40° C. to 100° C., for example. From the viewpoint of productive efficiency and quality such as impact absorbing properties of the obtained copolymer latex, the polymerization temperature for a period from a time when polymerization starts to a time when addition of the monomer mixture is completed is preferably 45° C. to 95° C., and is more preferably 55° C. to 90° C.

A method for raising a polymerization temperature in order to raise polymerization conversion of each monomer after addition of the total monomer mixture into a polymerization system is completed (the so-called cooking step) may also be used. The polymerization temperature at such a step is usually 80° C. to 100° C.

From the viewpoint of productive efficiency and control of the particle size upon emulsion polymerization, the concentration of a polymerized solid content in the method for producing a copolymer latex according to the present embodiment is preferably 35% by mass to 60% by mass, and more preferably 40% by mass to 57% by mass. The concentration of the polymerized solid content is a concentration of a solid content when polymerization is completed, and refers to a proportion of the mass of the solid content obtained by drying to the mass of the original copolymer latex (containing water and the like).

In the method for producing a copolymer latex according to the present embodiment, various known polymerization modifiers may be used when necessary during emulsion polymerization or at the end of emulsion polymerization. For example, pH adjusters, and chelating agents may be used.

Preferable examples of the pH adjusters include sodium hydroxide, potassium hydroxide, ammonium hydroxide, sodium hydrogencarbonate, disodium hydrogenphosphate, and amines such as monoethanolamine and triethanolamine. Moreover, examples of the chelating agents include sodium ethylenediaminetetraacetate.

The copolymer latex obtained by the method for producing a copolymer latex according to the present embodiment is usually provided as a final product in the state where the copolymer latex is dispersed in a solvent. The concentration of the solid content in this case is preferably 30% by mass to 60% by mass.

Various additives may be added to the copolymer latex obtained by the method for producing a copolymer latex according to the present embodiment when necessary, or other latex may be mixed with the copolymer latex and used unless the effect thereof is impaired. For example, a dispersing agent, an antifoaming agent, an antiaging agent, a water-resisting agent, a sanitizer, a thickener, a water retention agent, a printability agent, a lubricant, and a crosslinking agent may be added. Alkali-sensitive latices, organic pigments, urethane resin latices, acrylic resin latices, and the like may also be mixed and used. Other (diene) copolymer latex may be used in combination in the range not to impair the effect of the present invention.

The copolymer latex obtained by the method for producing a copolymer latex according to the present embodiment is used as a coating by adding various fillers, additives, other kinds of emulsion, and organic materials thereto.

Examples of the filler used in the coating include inorganic pigments such as calcium carbonate, kaolin clay, talc, diatomaceous earth, silica, mica, aluminum hydroxide, magnesium hydroxide, magnesium carbonate, sepiolite, alumina, titanium oxide, barium sulfate, and red iron oxide; glass materials such as glass beads, foamed glass beads, volcanic glass hollow bodies, and glass fibers; and organic pigments such as carbon black. One of these may be used alone, or not less than two thereof may be used in combination.

The amount of the filler to be added used in the coating is preferably 50 parts by mass to 400 parts by mass based on 100 parts by mass of the solid content of the copolymer latex. At such a range, in the obtained coating, high chipping resistance and blister resistance are compatible.

Examples of the additives used in the coating include plasticizers, dripping inhibitors, thickeners, antifoaming agents, dispersing agents, foaming agents, colloid stabilizing agents, antiseptics, PH regulators, antiaging agents, coloring agents, crosslinking agents, curing agents, and water retenting agents. One of these may be used alone, or not less than two thereof may be used in combination.

Examples of the thickeners used in the coating may include polycarboxylic acid salts, urethane association types, polyether types, cellulose ether, poly acrylic types, and polyacrylamides.

Examples of the crosslinking agents and the curing agents used in the coating may include polyfunctional epoxy compounds, block isocyanates, melamine resins, and oxazoline compounds.

Examples of the foaming agents used in the coating may include sodium bicarbonate, ammonium carbonate, nitroso compounds, azo compounds, and compounds such as sulfonylhydrazine.

Examples of the other kinds of emulsion used in the coating include natural rubber latices, acrylic resin latices, vinyl acetate latices, urethane resin latices, and epoxy resin latices.

Moreover, examples of the organic materials used in the coating include various resin powders, rubber powders, polyethylene glycol, carbon black, white carbon, cellulose powder, and starch.

In the case where the coating is prepared using the copolymer latex obtained by the method for producing a copolymer latex according to the present embodiment, various dispersing apparatuses conventionally known may be used. As the dispersing apparatus, butterfly mixers, planetary mixers, spiral mixers, rotary mixers, kneaders, dissolvers, and paint conditioners may be used, for example.

The coating using the copolymer latex obtained by the method for producing a copolymer latex according to the present embodiment may be applied to the substrate using a conventionally known method, for example, a spatula, a brush, an air spray, an airless spray, a mortar gun, a lysine gun, and a roll coater.

The copolymer latex according to the present embodiment may be preferably used for an aqueous coating, and more preferably may be used for a chipping resistant aqueous coating. Moreover, the copolymer latex according to the present embodiment may be used for a carpet backing agent, adhesives, various coatings, a binder for a coated paper, various coating agents and the like as other applications.

EXAMPLES

Next, the present embodiment will be more specifically described using Examples and Comparative Examples, but the embodiment will not be limited to Examples given below without departing from the gist thereof. Evaluation of respective physical properties was performed with the methods as follows.

(1) Toluene-Insoluble Matter and Degree of Swelling in Toluene

A copolymer latex whose concentration of a solid content was adjusted at 50% and pH was adjusted at 8 was dried for 30 minutes at 130° C. to obtain a dry substance (latex film). After 0.5 g of this latex film was mixed with 30 ml of toluene, and shaken for 3 hours, the solution was filtered with a metallic net having an opening of 32 μm. Then, the wet mass and dry mass of the residue were weighed. The proportion of the dry mass of the residue to the mass of the original latex film was defined as toluene-insoluble matter (% by mass). The ratio of the wet mass to the dry mass of the residue was defined as a degree of swelling in toluene.

(2) Measurement of Glass Transition Starting Temperature and Glass Transition Ending Temperature A copolymer latex whose concentration of a solid content was adjusted at 50% and pH was adjusted at 8 was dried for 30 minutes at 130° C. to obtain a dry substance (latex film). Using a differential scanning calorimeter (DSC6220 made by SII NanoTechnology Inc.), the temperature of the latex film was raised from −120° C. to +160° C. at a rate of 20° C./min. according to the ASTM method. Thus, a differential scanning calorimetry curve of the copolymer latex according to the present invention was obtained. A glass transition starting temperature was defined as a temperature at which a stepwise change of glass transition started with respect to the base line on a low temperature side as the temperature was raised and the curve began to depart from the base line. The glass transition ending temperature was defined as a temperature when the stepwise change finished with respect to the base line on a high temperature side and the curve returned to the base line. FIG. 1 shows an example of a differential scanning calorimetry curve.

(3) Particle Size of Latex

Using a light scattering photometer (made by C. N. Wood Co., model 6000), the number average particle size of the copolymer latex was measured at 45° of an initial angle and at 135° of a measurement angle by a dynamic light scattering method.

(4) Evaluation of Chipping Resistance (Chipping Strength)

A test plate coated with each coating and dried (dry film thickness of the coating film: 400 μm) was prepared, and the dry coating film on the test plate was fixed at an angle of 60° with respect to a level surface. Next, a pipe made of polyvinyl chloride and having a height of 2 m (inner diameter of 20 mm) was fixed onto the coating film surface vertically to the level surface. Then, M-4 nuts were continuously dropped from a height of 2 m to the film surface through the pipe to collide with the coating film surface. Then, the total mass (Kg) of the nuts needed to expose an electrodeposited plate as an undercoat was measured. The total mass was expressed as chipping strength (Kg).

(5) Blister Resistance (Limit Film Thickness for Blisters)

Respective coatings were applied onto a plurality of electrodeposited plates so that a dry film thickness of the coating might change in units of 100 μm. The coating was dried for 30 minutes at 140° C. using a hot air dryer, and presence/absence of blisters in the obtained dry coating film was checked visually. The maximum film thickness at which no blister was produced was determined, and the film thickness was defined as a limit film thickness for blisters. Preferably, no blister is produced in the dry coating film. From such a viewpoint, a larger limit film thickness for blisters is better. The limit film thickness for blisters is preferably not less than 1100 μm, and more preferably not less than 1200 μM.

(6) Adhesion of Coating Film

The surface of a dry coating film on an electrodeposited plate was crosscut at an equal interval using a cutter knife. In this case, the knife was used so as to reach an interface between the electrodeposited plate and the dry coating film. Next, a cellophane tape was attached onto a center of the crosscut portion, and stripped off at a constant force. The state of the electrodeposited plate after stripping off was observed visually, and graded with a five-point method using the criteria as follows. It was determined that more crosscut portions that remained on the electrodeposited plate were better, and a higher point was given. Preferably, adhesion of the coating film is not less than three points.

5: All of the crosscut portions did not come off and remained on the test plate.

4: Only a part of crosscut portions came off from the test plate among all of the crosscut portions.

3: Approximately a half of the crosscut portions came off from the test plate.

2: Most of the crosscut portions came off from the test plate.

1: All of the crosscut portions came off from the test plate.

(7) Effect when a Coating is Left as it is for a Long Time after the Coating is Applied Evaluation was made according to conditions described in JP 2004-91647 A. A coating was applied to an electrodeposited plate so that the dry film thickness might be 1000 μm, and was left for ten days under an environment at a temperature of 30° C. and a relative humidity of 80%. Then, the coating was dried for 30 minutes at 140° C. using a hot air dryer, and presence/absence of blisters and cracks in the obtained dry coating film was checked visually. A symbol ○ (good) designated the case where no blister nor crack was recognized, and a symbol X (bad) designated the case where blisters and cracks were recognized.

Production Example A1

As an initial raw material for polymerization, an initial raw material for polymerization containing 75 parts by mass of water, 0.6 parts by mass of sodium dodecyldiphenyletherdisulfonate, and a seed latex made of 3.0 parts by mass of polystyrene having the number average particle size of 65 nm was prepared in a pressure-resistant reaction container in batch, and sufficiently stirred at 70° C. Next, a mixture of a monomer for a first polymerization step and a chain transfer agent described in Table 1 and prepared for the first polymerization step (hereinafter, abbreviated as "mixture of a monomer and the like") was continuously added into this pressure-resistant container at a constant flow rate over 2 hours 45 minutes. On the other hand, after 10 minutes when this addition started, addition of an aqueous mixture made of 20 parts by mass of water, 0.15 parts by mass of sodium hydroxide, 0.2 parts by mass of sodium dodecyldiphenyletherdisulformate, and 0.8 parts by mass of sodium peroxydisulfate was started to initiate the polymerization reaction. This aqueous mixture was continuously added over 6 hours 50 minutes.

At the point of time when addition of the mixture of a monomer and the like for the first polymerization step was completed, and conversion of the first polymerization step reached 66%, a mixture of a monomer and the like for a second polymerization step was continuously added in this pressure-resistant container for 3 hours 15 minutes, and the polymerization reaction was continued.

After addition of the mixture of a monomer and the like for the second polymerization step was completed, the temperature within the pressure-resistant container was raised to 95° C., and the polymerization reaction was continued for 1 hour 30 minutes to enhance polymerization conversion.

Potassium hydroxide was added to this copolymer latex to adjust the pH at 8.0, and an unreacted monomer was removed by a steam stripping method. Finally, the concentration of a solid content was adjusted at 50% by mass. This copolymer latex was passed through a filter of the 325 mesh, and filtered to obtain copolymer latex A1. Table 1 shows evaluation results of the respective physical properties of copolymer latex A1.

Production Examples A2 and A3, B1 to B5

Copolymer latices A2 and A3 and B1 to B5 were all produced with the same procedure as that in Production Example A1 except that the initial raw material for polymerization, the composition of the mixture of a monomer and the like for each polymerization step, and conversion of the first polymerization step were changed as those shown in Table 1. Table 1 shows evaluation results of the respective physical properties of these.

Production Example A4

As an initial raw material for polymerization, an initial raw material for polymerization containing 70 parts by mass of water, 0.4 parts by mass of sodium dodecyldiphenyletherdisulfate, 0.8 parts by mass of a seed latex made of polystyrene having a number average particle size of 60 nm, 0.5 parts by mass of sodium peroxydisulfate, and 0.2 parts by mass of itaconic acid and a predetermined amount of a mixture of a monomer and the like for the first polymerization step shown in Table 1 was prepared in batch in the pressure-resistant reaction container, and reacted with each other at 60° C.

Then, at the point of time when conversion of the first polymerization step reached 90%, addition of a mixture of a monomer and the like for the second polymerization step was started. The mixture of a monomer and the like for the second polymerization step was continuously added into this pressure-resistant reaction container for 3 hours, and the polymerization reaction was continued.

From the point of time when the mixture of a monomer and the like for the second polymerization step was completed, the temperature within the pressure-resistant container was raised to 95° C., and the polymerization reaction was continued for 2 hours to enhance polymerization conversion.

Potassium hydroxide was added to this copolymer latex to adjust the pH at 8.0, and an unreacted monomer was removed by a steam stripping method. Finally, the concentration of a solid content was adjusted at 50% by mass. This copolymer latex was passed through a filter of the 325 mesh and filtered to obtain copolymer latex A4. Table 1 shows evaluation results of the respective physical properties of copolymer latex A4.

Production Examples A5 and B6 to B11

Copolymer latices A5 and B6 to B11 were all produced with the same procedure as that in Production Example A4 except that the initial raw material for polymerization, the composition of the mixture of a monomer and the like for each polymerization step, and conversion of the first polymerization step were changed as those shown in Table 1. Table 1 describes evaluation results of the respective physical properties of these.

Example 1

Copolymer latex A1 and the following materials were used and mixed uniformly to prepare a composition for an aqueous coating. The following blending (parts by mass) is expressed with values all converted into a solid content except water.

| | |
|---|---|
| Copolymer latex (A1) | 100 parts by mass |
| Heavy calcium carbonate | 200 parts by mass |
| Dispersing agent | 1 part by mass |
| Antifoaming agent | 0.2 parts by mass |
| Thickener | 3 parts by mass |

A trade name BF-300 (made by SHIRAISHI CALCIUM KAISHA, LTD.) was used for heavy calcium carbonate. A trade name Poise 530 (made by Kao Corp.) was used for the dispersing agent. A trade name SN Defoamer 777 (made by SAN NOPCO LIMITED) was used for the antifoaming agent. A trade name SN thickener A813 (made by SAN NOPCO LIMITED) was used for the thickener.

Next, using a spatula, the thus-obtained composition for an aqueous coating was applied onto an electrodeposited plate so that the film thickness of the coating film might be 400 μm. The coating film was formed by drying for 30 minutes at 140° C. using a hot air dryer, and used for each evaluation. With respect to blister resistance (limit film thickness for blisters), the coating film was formed while the film thickness of the coating film was variously changed, and the film thickness at which the coating film could be formed without blistering was observed. Table 2 shows the result.

The coating film obtained in Example 1 was a coating film in which chipping resistance, blister resistance, adhesion of the coating film, and the effect when a coating was left as it was for a long time after the coating was applied were compatible in good balance.

Examples 2 to 5

The coating was prepared and dried to form a coating film on the same conditions as those in Example 1 except that copolymer latex A1 was replaced by copolymer latices A2 to A5. Table 2 shows the result.

The coating films obtained in Examples 2 to 5 were a coating film in which chipping resistance, blister resistance, adhesion of the coating film, and the effect when a coating was left as it was for a long time after the coating was applied were compatible in good balance.

Comparative Example 1

The coating was prepared and dried to form a coating film on the same conditions as those in Example 1 except that copolymer latex A1 was replaced by copolymer latex B1. Table 2 shows the result. The coating film obtained in Comparative Example 1 was a coating film particularly having inferior blister resistance and a poor effect when a coating was left as it was for a long time after the coating was applied.

Comparative Example 2

The coating was prepared and dried to form a coating film on the same conditions as those in Example 1 except that copolymer latex A1 was replaced by copolymer latex B2. Table 2 shows the result. The coating film obtained in Comparative Example 2 was a coating film particularly having inferior chipping resistance, inferior adhesion, and a poor effect when a coating was left as it was for a long time after the coating was applied.

Comparative Example 3

The coating was prepared and dried to form a coating film on the same conditions as those in Example 1 except that copolymer latex A1 was replaced by copolymer latex B3. Table 2 shows the result. The coating film obtained in Comparative Example 3 was a coating film particularly having inferior blister resistance and a poor effect when a coating was left as it was for a long time after the coating was applied.

Comparative Example 4

The coating was prepared and dried to form a coating film on the same conditions as those in Example 1 except that copolymer latex A1 was replaced by copolymer latex B4. Table 2 shows the result. The coating film obtained in Comparative Example 4 was a coating film particularly having inferior blister resistance.

Comparative Example 5

The coating was prepared and dried to form a coating film on the same conditions as those in Example 1 except that copolymer latex A1 was replaced by copolymer latex B5. Table 2 shows the result. The coating film obtained in Comparative Example 5 was a coating film particularly inferior blister resistance and a poor effect when a coating was left as it was for a long time after the coating was applied.

Comparative Example 6

The coating was prepared and dried to form a coating film on the same conditions as those in Example 1 except that copolymer latex A1 was replaced by copolymer latex B6. Table 2 describes the result. The coating film obtained in Comparative Example 6 was a coating film particularly having inferior chipping resistance, inferior adhesion, and a poor effect when a coating was left as it was after the coating was applied.

Comparative Example 7

The coating was prepared and dried to form a coating film on the same conditions as those in Example 1 except that copolymer latex A1 was replaced by copolymer latex B7. Table 2 shows the result. The coating film obtained in Comparative Example 7 was a coating film particularly having inferior chipping resistance.

Comparative Example 8

The coating was prepared and dried to form a coating film on the same conditions as those in Example 1 except that copolymer latex A1 was replaced by copolymer latex B8. Table 2 shows the result. The coating film obtained in Comparative Example 8 was a coating film particularly having inferior chipping resistance.

Comparative Example 9

The coating was prepared and dried to form a coating film on the same conditions as those in Example 1 except that copolymer latex A1 was replaced by copolymer latex B9. Table 2 shows the result. The coating film obtained in Comparative Example 9 was a coating film particularly having inferior chipping resistance and a poor effect when a coating was left as it was for a long time after the coating was applied.

Comparative Example 10

The coating was prepared and dried to form a coating film on the same conditions as those in Example 1 except that copolymer latex A1 was replaced by copolymer latex B10. Table 2 shows the result. The coating film obtained in Comparative Example 10 was a coating film particularly having inferior chipping resistance and adhesion.

Comparative Example 11

The coating was prepared and dried to form a coating film on the same conditions as those in Example 1 except that copolymer latex A1 was replaced by copolymer latex B11. Table 2 shows the result. The coating film obtained in Comparative Example 11 was a coating film particularly having inferior chipping resistance.

TABLE 1

| Production conditions of copolymer latex | (Units) | Production Example A1 / A1 | Production Example A2 / A2 | Production Example A3 / A3 | Production Example A4 / A4 | Production Example A5 / A5 | Production Example B1 / B1 | Production Example B2 / B2 | Production Example B3 / B3 |
|---|---|---|---|---|---|---|---|---|---|
| Initial raw material for polymerization | | | | | | | | | |
| Emulsifier | Part by mass | 0.6 | 0.6 | 0.6 | 0.4 | 0.4 | 0.6 | 0.4 | 0.6 |
| Seed latex | Part by mass | 3.0 | 2.0 | 1.8 | 0.8 | 1.4 | 3.0 | 1.0 | 2.0 |
| IA | Part by mass | | 0.6 | | 0.2 | 0.2 | | 0.2 | 0.6 |
| Composition of monomer and the like for first polymerization step | | | | | | | | | |
| SM | Part by mass | 19 | 33.4 | 19 | 6.8 | 27.8 | 19 | 6.8 | 34.4 |
| BD | Part by mass | 30 | 35 | 30 | 25 | 36 | 30 | 25 | 34 |
| MMA | Part by mass | 1 | | 1 | | 1 | 1 | | |
| AN | Part by mass | | | | 8 | 5 | | 8 | |
| HEA | Part by mass | | 1 | | | | | | 1 |
| MSD | Part by mass | 0.050 | 0.070 | 0.050 | 0.040 | 0.070 | 0.050 | 0.040 | 0.070 |
| DDM | Part by mass | 0.100 | 0.070 | 0.100 | 0.040 | 0.035 | 0.150 | 0.020 | 0.140 |
| Composition of monomer and the like for second polymerization step | | | | | | | | | |
| SM | Part by mass | 30 | 16 | 30 | 28 | 13 | 30 | 28 | 16 |
| BD | Part by mass | 18 | 8 | 18 | 15 | 3 | 18 | 15 | 8 |
| MMA | Part by mass | | | | 1 | | | 1 | |
| AN | Part by mass | | | | 15 | 2 | | 15 | |
| HEA | Part by mass | | 5 | | | 10 | | | 5 |
| AA | Part by mass | 2 | 1 | 2 | 1 | 2 | 2 | 1 | 1 |
| MSD | Part by mass | 0.050 | 0.030 | 0.050 | 0.060 | 0.030 | 0.050 | 0.060 | 0.030 |
| DDM | Part by mass | 0.100 | 0.030 | 0.100 | 0.060 | 0.015 | 0.150 | 0.030 | 0.060 |
| First polymerization step conversion | % | 66 | 70 | 66 | 90 | 55 | 60 | 97 | 40 |
| Physical properties of copolymer latex | | | | | | | | | |
| Toluene-insoluble matter | % by mass | 96 | 97 | 96 | 98 | 99 | 94 | 99 | 96 |
| Degree of swelling in toluene | — | 5.6 | 5.4 | 5.8 | 3.5 | 6.0 | 6.0 | 2.7 | 7.0 |
| Particle size | nm | 210 | 240 | 250 | 300 | 250 | 210 | 300 | 240 |
| Glass transition starting temperature | ° C. | −43 | −28 | −42 | −43 | −26 | −43 | −43 | −26 |
| Glass transition ending temperature | ° C. | 18 | 21 | 20 | 46 | 46 | 18 | 46 | 21 |

| Production conditions of copolymer latex | (Units) | Production Example B4 / B4 | Production Example B5 / B5 | Production Example B6 / B6 | Production Example B7 / B7 | Production Example B8 / B8 | Production Example B9 / B9 | Production Example B10 / B10 | Production Example B11 / B11 |
|---|---|---|---|---|---|---|---|---|---|
| Initial raw material for polymerization | | | | | | | | | |
| Emulsifier | Part by mass | 0.7 | 0.6 | 0.2 | 0.6 | 0.6 | 0.6 | 0.6 | 0.6 |
| Seed latex | Part by mass | 6.0 | 2.0 | 0.2 | 1.6 | 2.3 | 1.6 | 1.6 | 1.6 |
| IA | Part by mass | 0.2 | | | 0.2 | | | | |
| Composition of monomer and the like for first polymerization step | | | | | | | | | |
| SM | Part by mass | 27.8 | 19 | 19 | 6 | 27 | 27 | 25 | 27 |
| BD | Part by mass | 36 | 30 | 30 | 43 | 20 | 43 | 45 | 20 |
| MMA | Part by mass | 1 | 1 | 1 | 0.8 | | | | |
| AN | Part by mass | 5 | | | | 2 | 5 | | 2 |
| HEA | Part by mass | | | | | 1 | | | 1 |
| MSD | Part by mass | 0.070 | 0.050 | 0.050 | 0.050 | 0.050 | 0.075 | 0.070 | 0.050 |
| DDM | Part by mass | 0.035 | 0.150 | 0.100 | 0.100 | 0.050 | 0.075 | 0.140 | 0.050 |
| Composition of monomer and the like for second polymerization step | | | | | | | | | |
| SM | Part by mass | 12 | 30 | 26 | 39 | 20 | 9.5 | 16 | 20 |
| BD | Part by mass | 3 | 18 | 16 | 10 | 15 | 8.5 | 2 | 15 |
| MMA | Part by mass | | | | | | | | |
| AN | Part by mass | 2 | | 2 | | 5 | | 10 | 5 |
| HEA | Part by mass | 10 | | 4 | | 8 | 6 | | 8 |
| AA | Part by mass | 3 | 2 | 2 | 1 | 2 | 1 | 2 | 2 |

TABLE 1-continued

Production Examples of copolymer latex

| | | | | | | | | | |
|---|---|---|---|---|---|---|---|---|---|
| MSD | Part by mass | 0.030 | 0.050 | 0.050 | 0.050 | 0.050 | 0.025 | 0.030 | 0.050 |
| DDM | Part by mass | 0.015 | 0.150 | 0.100 | 0.100 | 0.050 | 0.025 | 0.060 | 0.050 |
| First polymerization step conversion | % | 72 | 65 | 60 | 71 | 79 | 64 | 65 | 79 |
| Physical properties of copolymer latex | | | | | | | | | |
| Toluene-insoluble matter | % by mass | 99 | 94 | 96 | 96 | 98 | 97 | 96 | 98 |
| Degree of swelling in toluene | — | 5.0 | 5.9 | 6.0 | 5.3 | 4.7 | 5.9 | 5.8 | 4.8 |
| Particle size | nm | 165 | 240 | 440 | 230 | 210 | 240 | 240 | 230 |
| Glass transition starting temperature | °C. | −28 | −43 | −43 | −79 | −10 | −38 | −49 | −10 |
| Glass transition ending temperature | °C. | 50 | 19 | 20 | 57 | 17 | 0 | 115 | 17 |

Abbreviations in Table
Emulsifier: sodium dodecyldiphenyletherdisulfonate,
IA: itaconic acid,
SM: styrene,
BD: 1,3-butadiene,
MMA: methyl methacrylate,
AN: acrylonitrile,
HEA: 2-hydroxyethylacrylate,
AA: acrylic acid,
DDM: t-dodecylmercaptan,
MSD: α-methylstyrene dimer

TABLE 2

Examples and Comparative Examples

| | (Units) | Example 1 | Example 2 | Example 3 | Example 4 | Example 5 | Comparative Example 1 | Comparative Example 2 | Comparative Example 3 | Comparative Example 4 |
|---|---|---|---|---|---|---|---|---|---|---|
| Limit film thickness for blisters | μm | 1100 | 1300 | 1300 | 1800 | 1200 | 900 | 1900 | 800 | 900 |
| Chipping strength | Kg | 42 | 48 | 42 | 45 | 51 | 42 | 27 | 42 | 42 |
| Adhesion of coating film | | 3 | 4 | 3 | 4 | 5 | 3 | 1 | 3 | 4 |
| Effect when coating is left as it is for a long time after coating is applied | | ○ | ○ | ○ | ○ | ○ | X | X | X | ○ |

| | (Units) | Comparative Example 5 | Comparative Example 6 | Comparative Example 7 | Comparative Example 8 | Comparative Example 9 | Comparative Example 10 | Comparative Example 11 |
|---|---|---|---|---|---|---|---|---|
| Limit film thickness for blisters | μm | 1000 | 1400 | 1200 | 1300 | 1200 | 1200 | 1400 |
| Chipping strength | Kg | 42 | 27 | 27 | 21 | 28 | 24 | 21 |
| Adhesion of coating film | | 3 | 1 | 3 | 4 | 3 | 1 | 4 |
| Effect when coating is left as it is for a long time after coating is applied | | X | X | ○ | ○ | X | ○ | ○ |

Production Example A6

As an initial raw material for polymerization, an initial raw material for polymerization containing 0.2 parts by mass of sodium dodecyldiphenyletherdisulfonate and 1.4 parts by mass of a seed latex made of polystyrene and having a number average particle size of 60 nm, 70 parts by mass of water, 0.5 parts by mass of sodium peroxydisulfate, a predetermined amount of a mixture of a monomer mixture for the first step and a chain transfer agent shown in Table 3, (hereinafter, abbreviated as a "mixture of a monomer and the like") were prepared in batch in the pressure-resistant reaction container, and reacted at 60° C.

Then, at the point of time when polymerization conversion at the first step reached 64%, addition of a mixture of a monomer and the like for the second step was started. The mixture of the monomer and the like for the second step was continuously added into this pressure-resistant container for 3 hours, and the polymerization reaction was continued.

The temperature within the pressure-resistant container was raised to 95° C. from the point of time when addition of the mixture of the monomer and the like for the second step was completed, and the polymerization reaction was continued for 2 hours to enhance polymerization conversion.

Potassium hydroxide was added to this copolymer latex to adjust the pH at 8.0, and an unreacted monomer was removed by a steam stripping method. Finally, the concentration of a solid content was adjusted at 50% by mass. This copolymer latex was passed through a filter of the 325 mesh and filtered to obtain copolymer latex A6. Table 3 shows the evaluation results of the respective physical properties of copolymer latex A6.

Production Examples A7 and B12 to B19

Copolymer latices A7 and B12 to B19 were all produced with the same procedure as that in Production Example A6 except that the initial raw material for polymerization, the composition of the mixture of a monomer and the like for each polymerization step, and conversion of the first polymerization step were changed as those shown in Table 3. Table 3 shows the evaluation results of the respective physical properties of these. In Production Example B19, a large amount of aggregation was produced in the latex, and a latex that deserved implementation was not obtained.

Example 6

Copolymer latex A6 and the following materials were used and mixed uniformly to prepare a composition for an aqueous coating. The following blending (parts by mass) is expressed with values all converted into a solid content except water.

| | |
|---|---|
| Copolymer latex (A6) | 100 parts by mass |
| Heavy calcium carbonate | 200 parts by mass |
| Dispersing agent | 1 part by mass |
| Antifoaming agent | 0.2 parts by mass |
| Thickener | 3 parts by mass |

A trade name BF-300 (made by SHIRAISHI CALCIUM KAISHA, LTD.) was used for heavy calcium carbonate. A trade name Poise 530 (made by Kao Corp.) was used for the dispersing agent. A trade name SN Defoamer 777 (made by SAN NOPCO LIMITED) was used for the antifoaming agent. A trade name SN thickener A813 (made by SAN NOPCO LIMITED) was used for the thickener.

Next, using a spatula, the thus-obtained composition for an aqueous coating was applied onto an electrodeposited plate so that the film thickness of the coating film might be 400 μm. The coating film was formed by drying for 30 minutes at 140° C. using a hot air dryer, and used for each evaluation. With respect to blister resistance (limit film thickness for blisters), the coating film was formed while the film thickness of the coating film was variously changed, and the film thickness at which the coating film could be formed without blistering was observed. Table 4 shows the result.

The coating film obtained in Example 6 was a coating film in which chipping resistance, blister resistance, adhesion of the coating film, and the effect when a coating was left as it was for a long time after the coating was applied were compatible in good balance.

Example 7

The coating was prepared and dried to form a coating film on the same conditions as those in Example 6 except that copolymer latex A6 was replaced by copolymer latex A7. Table 4 shows the result.

The coating film obtained in Example 7 was a coating film in which chipping resistance, blister resistance, adhesion of the coating film, and the effect when a coating was left as it was for a long time after the coating was applied were compatible in good balance.

Comparative Example 12

The coating was prepared and dried to form a coating film on the same conditions as those in Example 6 except that copolymer latex A6 was replaced by copolymer latex B12. Table 4 shows the result. The coating film obtained in Comparative Example 12 was a coating film particularly having inferior blister resistance and a poor effect when a coating was left as it was for a long time after the coating was applied.

Comparative Example 13

The coating was prepared and dried to form a coating film on the same conditions as those in Example 6 except that copolymer latex A6 was replaced by copolymer latex B13. Table 4 shows the result. The coating film obtained in Comparative Example 13 was a coating film particularly having inferior chipping resistance, inferior adhesion, and a poor effect when a coating was left as it was for a long time after the coating was applied.

Comparative Example 14

The coating was prepared and dried to form a coating film on the same conditions as those in Example 6 except that copolymer latex A6 was replaced by copolymer latex B14. Table 4 shows the result. The coating film obtained in Comparative Example 14 was a coating film particularly having inferior blister resistance and a poor effect when a coating was left as it was for a long time after the coating was applied.

Comparative Example 15

The coating was prepared and dried to form a coating film on the same conditions as those in Example 6 except that copolymer latex A6 was replaced by copolymer latex B15. Table 4 shows the result. The coating film obtained in Comparative Example 15 was a coating film particularly having inferior blister resistance.

Comparative Example 16

The coating was prepared and dried to form a coating film on the same conditions as those in Example 6 except that copolymer latex A6 was replaced by copolymer latex B16. Table 4 shows the result. The coating film obtained in Comparative Example 16 was a coating film particularly having inferior chipping resistance.

Comparative Example 17

The coating was prepared and dried to form a coating film on the same conditions as those in Example 6 except that copolymer latex A6 was replaced by copolymer latex B17. Table 4 shows the result. The coating film obtained in Comparative Example 17 was a coating film particularly having inferior chipping resistance, inferior adhesion, and a poor effect when a coating was left as it was for a long time after the coating was applied.

Comparative Example 18

The coating was prepared and dried to form a coating film on the same conditions as those in Example 6 except that copolymer latex A6 was replaced by copolymer latex B18. Table 4 shows the result. The coating film obtained in Comparative Example 18 was a coating film particularly having inferior blister resistance and a poor effect when a coating was left as it was for a long time after the coating was applied.

TABLE 3

Production Examples of copolymer latex

| Production conditions of copolymer latex | (Units) | Production Example A6 | Production Example A7 | Production Example B12 | Production Example B13 | Production Example B14 | Production Example B15 | Production Example B16 | Production Example B17 | Production Example B18 | Production Example B19 |
|---|---|---|---|---|---|---|---|---|---|---|---|
| | | A6 | A7 | B12 | B13 | B14 | B15 | B16 | B17 | B18 | B19 |
| Initial raw material for polymerization | | | | | | | | | | | |
| Emulsifier | Part by mass | 0.2 | 0.4 | 0.4 | 0.4 | 0.4 | 0.4 | 0.4 | 0.4 | 0.4 | 0.4 |
| Seed latex | Part by mass | 1.4 | 1.6 | 0.8 | 0.8 | 0.8 | 5.0 | 0.8 | 0.8 | 1.4 | 2.3 |
| IA | Part by mass | | 0.2 | 0.2 | 0.2 | | 0.2 | 0.2 | 0.2 | 0.2 | |
| Composition of first step monomer and the like | | | | | | | | | | | |
| SM | Part by mass | 19 | 12.8 | 6.8 | 6.8 | 23 | 27.8 | 7.8 | 6.8 | 15.8 | 31 |
| BD | Part by mass | 30 | 35 | 25 | 25 | 33 | 36 | 19 | 25 | 29 | 48 |
| MMA | Part by mass | 1 | | | | 1 | 1 | | | | 1 |
| AN | Part by mass | | | 8 | 8 | | 5 | 3 | 8 | 5 | |
| HEA | Part by mass | | 2 | | | 3 | | | | | |
| MSD | Part by mass | 0.050 | 0.050 | 0.040 | 0.020 | 0.060 | 0.070 | 0.030 | | 0.050 | 0.080 |
| DDM | Part by mass | 0.100 | 0.050 | 0.160 | 0.020 | 0.120 | 0.035 | 0.030 | | 0.150 | 0.160 |
| Composition of second step monomer and the like | | | | | | | | | | | |
| SM | Part by mass | 32 | 33 | 28 | 28 | 25 | 13 | 48.5 | 28 | 30 | 15 |
| BD | Part by mass | 16 | 11 | 15 | 15 | 9 | 3 | 15 | 15 | 13 | 3 |
| MMA | Part by mass | | | 1 | 1 | | | | 1 | | |
| AN | Part by mass | | | 15 | 15 | | 2 | 5 | 15 | 5 | |
| HEA | Part by mass | | 4 | | | 4 | 10 | | | | |
| AA | Part by mass | 2 | 2 | 1 | 1 | 2 | 2 | 1.5 | 1 | 2 | 2 |
| MSD | Part by mass | 0.050 | 0.050 | 0.060 | 0.030 | 0.040 | 0.030 | 0.070 | | 0.050 | 0.020 |
| DDM | Part by mass | 0.100 | 0.050 | 0.240 | 0.030 | 0.080 | 0.015 | 0.070 | | 0.150 | 0.040 |
| First step conversion | % | 64 | 80 | 84 | 98 | 44 | 55 | 62 | 91 | 70 | 55 |
| Physical properties of copolymer latex | | | | | | | | | | | |
| Toluene-insoluble matter | % by mass | 96 | 98 | 92 | 100 | 96 | 99 | 98 | 100 | 94 | Large amount of aggregation produced in latex |
| Degree of swelling in toluene | — | 5.5 | 4.2 | 6.8 | 2.5 | 7.6 | 4.5 | 5.4 | 2.1 | 6.0 | |
| Particle size | nm | 250 | 240 | 300 | 300 | 300 | 165 | 300 | 300 | 250 | |
| Glass transition starting temperature | °C. | −43 | −60 | −45 | −41 | −40 | −26 | −46 | −41 | −39 | |
| Glass transition ending temperature | °C. | 29 | 42 | 42 | 49 | 42 | 46 | 56 | 47 | 46 | |

Abbreviations in Table
Emulsifier: sodium dodecyldiphenyletherdisulfonate,
IA: itaconic acid,
SM: styrene,
BD: 1,3-butadiene,
MMA: methyl methacrylate,
AN: acrylonitrile,
HEA: 2-hydroxyethylacrylate,
AA: acrylic acid,
DDM: t-dodecylmercaptan,
MSD: α-methylstyrene dimer

TABLE 4

Examples and Comparative Examples

| | (Units) | Example 6 | Example 7 | Comparative Example 12 | Comparative Example 13 | Comparative Example 14 | Comparative Example 15 | Comparative Example 16 | Comparative Example 17 | Comparative Example 18 |
|---|---|---|---|---|---|---|---|---|---|---|
| Limit film thickness for blisters | μm | 1200 | 1500 | 800 | 1900 | 1000 | 900 | 1200 | 2000 | 1000 |
| Chipping strength | Kg | 42 | 45 | 42 | 21 | 42 | 42 | 24 | 21 | 42 |
| Adhesion of coating film | — | 3 | 4 | 3 | 1 | 3 | 4 | 3 | 1 | 3 |
| Effect when coating is left as it is for a long time after coating is applied | — | ○ | ○ | X | X | X | ○ | ○ | X | X |

Production Example A8

As an initial raw material for polymerization, an initial raw material for polymerization containing 0.2 parts by mass of sodium dodecyldiphenyletherdisulfonate and 1.4 parts by mass of a seed latex made from polystyrene having a number average particle size of 60 nm, 70 parts by mass of water, 0.5 parts by mass of sodium peroxydisulfate, a predetermined amount of a mixture of a monomer mixture for the first step and a chain transfer agent shown in Table 5, (hereinafter, abbreviated as a "mixture of a monomer and the like") were prepared in batch in a pressure-resistant reaction container, and reacted at 60° C.

Then, at the point of time when polymerization conversion at the first step reached 64%, addition of a predetermined amount of a mixture of a monomer and the like for the second step shown in Table 5 was started. The mixture of a monomer and the like for the second step was continuously added into this pressure-resistant container at a constant rate over 3 hours. Further, from the point of time when the mixture of a monomer and the like for the second step was added for 1 hour 50 minutes, 0.050 parts by mass of t-dodecyl mercaptan was further continuously added into this pressure-resistant container in for 1 hour 10 minutes as a post-added chain transfer agent for the second step, and the polymerization reaction was continued.

The temperature within the pressure-resistant container was raised to 95° C. from the point of time when addition of the mixture of the monomer and the like for the second step was completed, and the polymerization reaction was continued for 2 hours to enhance polymerization conversion.

Potassium hydroxide was added to this copolymer latex to adjust the pH at 8.0, and an unreacted monomer was removed by a steam stripping method. Finally, the concentration of a solid content was adjusted at 50% by mass. This copolymer latex was passed through a filter of the 325 mesh and filtered to obtain copolymer latex A8. Table 5 shows the evaluation results of the respective physical properties of copolymer latex A8.

Production Examples A9 to A12

Copolymer latices A9 to A12 were all produced with the same procedure as that in Production Example A8 except that the initial raw material for polymerization, the composition of the mixture of a monomer and the like for each polymerization step, the post-added chain transfer agent for the second step, and conversion of the first polymerization step were changed as those shown in Table 5. Table 5 shows the evaluation results of the respective physical properties of these.

Production Examples A13 and B20

Copolymer latices A13 and B20 were all produced with the same procedure as that in Production Example A6 except that the initial raw material for polymerization, the composition of the mixture of a monomer and the like for each polymerization step, and conversion of the first polymerization step were changed as those shown in Table 5. Table 5 shows the evaluation results of the respective physical properties of these.

Production Example A14

As an initial raw material for polymerization, an initial raw material for polymerization containing 0.2 parts by mass of sodium dodecyldiphenyletherdisulfonate and 0.8 parts by mass of a seed latex made of polystyrene having a number average particle size of 60 nm, 70 parts by mass of water, 0.5 parts by mass of sodium peroxodisulfate, and a predetermined amount of the mixture of a monomer and the like for the first step shown in Table 5 were prepared in batch in the pressure-resistant reaction container, and reacted at 60° C.

Then, at the time when conversion of the first polymerization step reached 84%, addition of a predetermined amount of the mixture of a monomer and the like for the second polymerization step shown in Table 5 was started. The mixture of a monomer and the like for the second step was continuously added in this pressure-resistant container at a constant rate over 3 hours. Further, from the point of time when the mixture of a monomer and the like for the second step was added for 1 hour, 0.100 parts by mass of t-dodecyl mercaptan was further continuously added into this pressure-resistant container at a constant rate over 2 hours as a post-added chain transfer agent for the second step, and the polymerization reaction was continued.

The temperature within the pressure-resistant container was raised to 95° C. from the point of time when addition of the mixture of the monomer and the like for the second step was completed, and the polymerization reaction was continued for 2 hours to enhance polymerization conversion.

Potassium hydroxide was added to this copolymer latex to adjust the pH at 8.0, and an unreacted monomer was removed by a steam stripping method. Finally, the concentration of a solid content was adjusted at 50% by mass. This copolymer latex was passed through a filter of the 325 mesh and filtered to obtain copolymer latex A14. Table 5 shows the evaluation results of the respective physical properties of copolymer latex A14.

Example 8

Copolymer latex A8 and the following materials were used and mixed uniformly to prepare a composition for an aqueous coating. The following blending (parts by mass) is expressed with values all converted into a solid content except water.

| | |
|---|---|
| Copolymer latex (A8) | 100 parts by mass |
| Heavy calcium carbonate | 200 parts by mass |
| Dispersing agent | 1 part by mass |
| Antifoaming agent | 0.2 parts by mass |
| Thickener | 3 parts by mass |

A trade name BF-300 (made by SHIRAISHI CALCIUM KAISHA, LTD.) was used for heavy calcium carbonate. A trade name Poise 530 (made by Kao Corp.) was used for the dispersing agent. A trade name SN Defoamer 777 (made by SAN NOPCO LIMITED) was used for the antifoaming agent. A trade name SN thickener A813 (made by SAN NOPCO LIMITED) was used for the thickener.

Next, using a spatula, the thus-obtained composition for an aqueous coating was applied onto an electrodeposited plate so that the film thickness of the coating film might be 400 μm. The coating film was formed by drying for 30 minutes at 140° C. using a hot air dryer, and used for each evaluation. With respect to blister resistance (limit film thickness for blisters), the coating film was formed while the film thickness of the coating film was variously changed, and the film thickness at which the coating film could be formed without blistering was observed. Table 6 shows the result.

The coating film obtained in Example 8 was a coating film in which chipping resistance, blister resistance, adhesion of the coating film, and the effect when a coating was left as it was for a long time after the coating was applied were compatible in good balance.

Examples 9 to 14

The coating was prepared and dried to form a coating film on the same conditions as those in Example 8 except that copolymer latex A8 was replaced by copolymer latices A9 to A14. Table 6 shows the results.

The coating films obtained in Examples 9 to 14 were a coating film in which chipping resistance, blister resistance, adhesion of the coating film, and the effect when a coating was left as it was for a long time after the coating was applied were compatible in good balance.

Comparative Example 20

The coating was prepared and dried to form a coating film on the same conditions as those in Example 8 except that copolymer latex A8 was replaced by copolymer latex B20. Table 6 shows the result.

The coating film obtained in Comparative Example 20 was a coating film particularly having inferior blister resistance and a poor effect when a coating was left as it was for a long time after the coating was applied.

Example 15

Copolymer latex A8 and the following materials were used and mixed uniformly to prepare a composition for an aqueous coating. The following blending (parts by mass) is expressed with values all converted into a solid content except water.

| | |
|---|---|
| Copolymer latex (A8) | 100 parts by mass |
| Heavy calcium carbonate | 280 parts by mass |
| Dispersing agent | 1 part by mass |
| Antifoaming agent | 0.2 parts by mass |
| Thickener | 3 parts by mass |

Next, using a spatula, the thus-obtained composition for an aqueous coating was applied onto an electrodeposited plate so that the film thickness of the coating film might be 400 μm. The coating film was formed by drying for 30 minutes at 140° C. using a hot air dryer, and used for each evaluation of adhesion of a coating film. Table 7 shows the result.

The coating film obtained in Example 15 was a coating film having high adhesion of a coating film.

Examples 16 to 21

The coating was prepared and dried to form a coating film on the same conditions as those in Example 15 except that copolymer latex A8 was replaced by copolymer latices A9 to A14. Table 7 shows the results.

The coating films obtained in Example 16 to 21 were a coating film having high adhesion of a coating film.

Example 22

The coating was prepared and dried to form a coating film on the same conditions as those in Example 15 except that copolymer latex A8 was replaced by copolymer latex A6. Table 7 shows the result.

The coating film obtained in Example 22 was a coating film having inferior adhesion of a coating film.

Comparative Example 21

The coating was prepared and dried to form a coating film on the same conditions as those in Example 15 except that copolymer latex A8 was replaced by copolymer latex B20. Table 7 shows the result.

The coating film obtained in Comparative Example 21 was a coating film having inferior adhesion of a coating film.

TABLE 5

Production Examples of copolymer latex

| Production conditions of copolymer latex | (Units) | Production Example A8 | Production Example A9 | Production Example A10 | Production Example A11 | Production Example A12 | Production Example A13 | Production Example A14 | Production Example B20 |
|---|---|---|---|---|---|---|---|---|---|
| | | | | | Copolymer latex | | | | |
| | | A8 | A9 | A10 | A11 | A12 | A13 | A14 | B20 |
| Initial raw material for polymerization | | | | | | | | | |
| Emulsifier | Part by mass | 0.2 | 0.4 | 0.4 | 0.2 | 0.2 | 0.4 | 0.2 | 0.4 |
| Seed latex | Part by mass | 1.4 | 1.6 | 0.8 | 1.4 | 1.2 | 1.6 | 0.8 | 0.8 |
| IA | Part by mass | | 0.2 | 0.2 | 0.2 | 0.5 | 0.2 | | 0.2 |
| Composition of first step monomer and the like | | | | | | | | | |
| SM | Part by mass | 19 | 12.8 | 6.8 | 20.8 | 14.5 | 12.8 | 17 | 6.8 |
| BD | Part by mass | 30 | 35 | 25 | 42 | 36 | 35 | 35 | 25 |
| MMA | Part by mass | 1 | | | | | | | |
| AN | Part by mass | | | 8 | 7 | 6 | | 8 | 8 |
| HEA | Part by mass | | 2 | | | 3 | 2 | | |
| MSD | Part by mass | 0.050 | 0.050 | 0.040 | | 0.060 | 0.050 | 0.060 | 0.040 |
| DDM | Part by mass | 0.100 | 0.050 | 0.040 | 0.070 | 0.060 | 0.050 | 0.060 | 0.240 |
| Composition of second step monomer and the like | | | | | | | | | |
| SM | Part by mass | 32 | 33 | 28 | 12 | 16 | 33 | 15 | 28 |
| BD | Part by mass | 16 | 11 | 15 | 8 | 12 | 11 | 15 | 15 |
| MMA | Part by mass | | | 1 | | | | | 1 |

TABLE 5-continued

Production Examples of copolymer latex

| Production conditions of copolymer latex | (Units) | Production Example A8 / A8 | Production Example A9 / A9 | Production Example A10 / A10 | Production Example A11 / A11 | Production Example A12 / A12 | Production Example A13 / A13 | Production Example A14 / A14 | Production Example B20 / B20 |
|---|---|---|---|---|---|---|---|---|---|
| AN | Part by mass | | | 15 | 6 | 8 | | 8 | 15 |
| HEA | Part by mass | | 4 | | 3 | 3 | 4 | | |
| AA | Part by mass | 2 | 2 | 1 | 1 | 1 | 2 | 2 | 1 |
| MSD | Part by mass | 0.050 | 0.050 | 0.060 | | 0.040 | 0.050 | 0.040 | 0.060 |
| DDM | Part by mass | 0.100 | 0.050 | 0.060 | 0.030 | 0.040 | 0.100 | 0.040 | 0.060 |
| Post-added chain transfer agent at second step | | | | | | | | | |
| DDM | Part by mass | 0.050 | 0.050 | 0.100 | 0.250 | 0.075 | | 0.100 | |
| First step conversion | % | 64 | 80 | 90 | 90 | 85 | 80 | 84 | 80 |
| Physical properties of copolymer latex | | | | | | | | | |
| Toluene-insoluble matter | % by mass | 96 | 97 | 96 | 96 | 97 | 96 | 96 | 94 |
| Degree of swelling in toluene | — | 5.6 | 4.5 | 4.2 | 5.4 | 4.9 | 4.8 | 5.0 | 7.0 |
| Particle size | nm | 250 | 240 | 300 | 250 | 260 | 240 | 300 | 300 |
| Glass transition starting temperature | °C. | −43 | −60 | −43 | −41 | −46 | −60 | −38 | −47 |
| Glass transition ending temperature | °C. | 28 | 41 | 43 | 43 | 38 | 39 | 23 | 44 |

Abbreviations in Table
Emulsifier: sodium dodecyldiphenyletherdisulfonate,
IA: itaconic acid,
SM: styrene,
BD: 1,3-butadiene,
MMA: methyl methacrylate,
AN: acrylonitrile,
HEA: 2-hydroxyethylacrylate,
AA: acrylic acid,
DDM: t-dodecylmercaptan,
MSD: α-methylstyrene dimer

TABLE 6

Examples and Comparative Examples

| | (Units) | Example 8 | Example 9 | Example 10 | Example 11 | Example 12 | Example 13 | Example 14 | Comparative Example 20 |
|---|---|---|---|---|---|---|---|---|---|
| Limit film thickness for blisters | μm | 1200 | 1500 | 1700 | 1200 | 1400 | 1300 | 1500 | 1000 |
| Chipping strength | Kg | 42 | 45 | 45 | 45 | 48 | 45 | 42 | 42 |
| Adhesion of coating film | — | 4 | 5 | 5 | 5 | 5 | 4 | 4 | 3 |
| Effect when coating is left as it is for a long time after coating is applied | — | ○ | ○ | ○ | ○ | ○ | ○ | ○ | X |

TABLE 7

Examples and Comparative Examples

| | (Units) | Example 15 | Example 16 | Example 17 | Example 18 | Example 19 | Example 20 | Example 21 | Example 22 | Comparative Example 21 |
|---|---|---|---|---|---|---|---|---|---|---|
| Adhesion of coating film | — | 3 | 4 | 4 | 5 | 5 | 3 | 4 | 1 | 1 |

INDUSTRIAL APPLICABILITY

The copolymer latex according to the present invention may be preferably used for an aqueous coating. For example, it is suitably used as a material for an automobile baking aqueous coating. The copolymer latex according to the present invention may also be used for a carpet backing agent, adhesives, various coatings, a binder for a coated paper, various coating agents and the like as other applications.

The invention claimed is:

1. A copolymer latex obtained by emulsion polymerizing a monomer mixture containing: (a) 30% by mass to 70% by mass of a conjugated diene monomer, (b) 0.1% by mass to 15% by mass of an ethylene unsaturated carboxylic acid monomer, and (c) 15% by mass to 69.9% by mass of one or more other copolymerizable monomers (wherein (a)+(b)+(c)=100% by mass),
wherein toluene-insoluble matter in a dry substance obtained by drying the copolymer latex is in a range of more than 95% by mass to 100% by mass; a ratio of a mass of a toluene wet product of the toluene-insoluble matter to a mass of the dry substance of the toluene-insoluble matter (degree of swelling in toluene) are 3.0 to 6.5; the copolymer latex has a number average particle size of 180 nm to 400 nm; and the dry substance obtained by drying the copolymer latex has a glass transition starting temperature in a range of −70° C. to −20° C., and a glass transition ending temperature in a range of 10° C. to 100° C., as measured by differential scanning calorimetry, and
wherein the glass transition starting temperature is defined as a temperature at which a stepwise change of glass transition starts with respect to a base line on a low temperature side and the curve begins to depart from the base line, and the glass transition ending temperature is defined as a temperature when the stepwise change finishes with respect to the base line on a high temperature side and the curve returns to the base line.

2. The copolymer latex according to claim 1, wherein the polymer latex has a number average particle size of 200 nm to 350 nm.

3. The copolymer latex according to claim 1, wherein the polymer latex has a number average particle size of 220 nm to 330 nm.

4. The copolymer latex according to claim 1, wherein as the (c) other copolymerizable monomer, 1% by mass to 15% by mass of a monomer having a hydroxyalkyl group is contained in the monomer mixture.

5. The copolymer latex according to claim 1, wherein as the (c) other copolymerizable monomer, 1% by mass to 30% by mass of a vinyl cyanide monomer is contained in the monomer mixture.

6. A method for producing a copolymer latex for a chipping-resistant coating, wherein the copolymer latex has a number average particle size of 180 nm to 400 nm, toluene-insoluble matter in a dry substance obtained by drying the copolymer latex is 95% by mass to 100% by mass; a ratio of a mass of a toluene wet product of the toluene-insoluble matter to a mass of the dry substance of the toluene-insoluble matter (degree of swelling in toluene) are 3.0 to 6.5; and the dry substance obtained by drying the copolymer latex has a glass transition starting temperature in a range of −70° C. to −20° C., and a glass transition ending temperature in a range of 10° C. to 100° C., the method comprising: emulsion polymerizing through at least not less than two steps, a monomer mixture containing: (a) 30% by mass to 70% by mass of a conjugated diene monomer, (b) 0.1% by mass to 15% by mass of an ethylene unsaturated carboxylic acid monomer, and (c) 15% by mass to 69.9% by mass of one or more other copolymerizable monomers (wherein (a)+(b)+(c)=100% by mass),
wherein a total of an amount of a chain transfer agent to be used in all the polymerization steps is not less than 0.050 parts by mass and less than 0.400 parts by mass based on 100 parts by mass of the total monomer mixture, the method comprising: a first step of preparing 40% by mass to 75% by mass of the total monomer mixture, and polymerizing the monomer mixture until the polymerization conversion reaches 50% by mass to 95% by mass, and then, second and subsequent steps of continuously or intermittently adding the remaining monomer mixture equivalent to 25% by mass to 60% by mass of the total monomer mixture to perform emulsion polymerization.

7. The method according to claim 6, wherein f>e is satisfied where e designates part by mass of a chain transfer agent for the first step based on 100 parts by mass of the monomer mixture at the first step, and f designates part by mass of a chain transfer agent for the second and subsequent steps based on 100 parts by mass of the monomer mixture at the second and subsequent steps.

8. The method according to claim 6 or 7, wherein x and y satisfy following expressions (I):

$$0.01 \leq x \leq 0.50,$$

$$0.02 \leq y \leq 1.50,$$

$$x<y, \text{ and}$$

$$x+y=f, \text{ where} \qquad (I)$$

at the second and subsequent steps, the monomer mixture equivalent to 50 parts by mass of the monomer mixture based on 100 parts by mass of the monomer mixture at the second and subsequent steps and x part by mass of f parts by mass of the chain transfer agent at the second and subsequent steps are added continuously or intermittently, and then, the remaining monomer mixture equivalent to 50 parts by mass of the monomer mixture based on 100 parts by mass of the monomer mixture at the second and subsequent steps and y part by mass of the remaining chain transfer agent of f part by mass of the chain transfer agent at the second and subsequent steps are added continuously or intermittently to be polymerized.

9. The method according to claim 6, wherein the chain transfer agent is a chain transfer agent selected from mercaptans or a combination of a chain transfer agent selected from mercaptans and other chain transfer agent.

10. The method according to claim 6, wherein as the (c) other copolymerizable monomer, 1% by mass to 15% by mass of a monomer having a hydroxyalkyl group is contained in the monomer mixture.

11. The method according to claim 6, wherein as the (c) other copolymerizable monomer, 1% by mass to 30% by mass of a vinyl cyanide monomer is contained in the monomer mixture.

12. The method according to claim 6, wherein at the first step of preparing 40% by mass to 75% by mass of the total monomer mixture, and polymerizing the monomer mixture until the polymerization conversion reaches 50% by mass to 95% by mass, 40% by mass to 75% by mass of the total monomer mixture is prepared in batch to be polymerized.

13. A composition for an aqueous coating, comprising a copolymer latex according to claim 1.

14. A composition for a chipping-resistant coating, comprising a copolymer latex according to claim 1.

* * * * *